US 6,667,843 B2
United States Patent
Norman et al.

(10) Patent No.: US 6,667,843 B2
(45) Date of Patent: Dec. 23, 2003

(54) INTEGRATED PROGRAMMABLE ERROR AMPLIFIER

(75) Inventors: Robert A. Norman, Bloomington, MN (US); David W. Kelly, Lino Lakes, MN (US); Jason P. Brenden, Eagan, MN (US)

(73) Assignee: Agere Systems Inc., Allentown, PA (US)

( * ) Notice: Subject to any disclaimer, the term of this patent is extended or adjusted under 35 U.S.C. 154(b) by 413 days.

(21) Appl. No.: 09/797,395

(22) Filed: Mar. 1, 2001

(65) Prior Publication Data
US 2002/0149874 A1 Oct. 17, 2002

(51) Int. Cl.[7] .......................... G11B 5/02; G11B 21/02; G11B 5/596; G11B 21/08
(52) U.S. Cl. ........................ 360/67; 360/75; 360/78.04; 318/560
(58) Field of Search ................ 360/78.09, 67, 360/69, 75, 78.04, 78.14, 78.06, 78.07, 78.08, 78.12; 318/560, 561, 600, 432; G11B 5/54, 5/55, 5/02, 5/596, 21/02, 21/08

(56) References Cited

U.S. PATENT DOCUMENTS 6,373,650 B1 * 4/2002 Pedrazzini .................. 360/75
6,417,639 B1 * 7/2002 Schillaci et al. ............ 318/560

FOREIGN PATENT DOCUMENTS

WO   WO 97/41558   * 11/1997   .......... G11B/15/46

OTHER PUBLICATIONS

Carter, "A Differential Op-Amp Circuit Collection", Application Report, Jul. 2001, Texas Instruments Incorporated.*

* cited by examiner

Primary Examiner—David Hudspeth
Assistant Examiner—Dan I. Davidson
(74) Attorney, Agent, or Firm—Kinney & Lange, P.A.

(57) ABSTRACT

An error amplifier for use in a disk drive actuator system having an actuator motor for radially positioning a transducing head with respect to a rotatable disk is newly designed to enable full implementation as an integrated circuit. The error amplifier includes a switched-capacitor proportional-integral controller for comparing first and second differential input signals representing a respective actual current and commanded current for driving the actuator motor, and providing a differential output signal. A transconductor-capacitor filter is connected to filter the differential output signal of the switched-capacitor integrator, and provides a motor control signal to control the actuator motor.

18 Claims, 8 Drawing Sheets

INTEGRATED PROGRAMMABLE ERROR AMPLIFIER

BACKGROUND OF THE INVENTION

The present invention relates to a disk drive actuator system, and more particularly to an integrated programmable error amplifier for controlling a current signal used to drive an actuator to position a transducing head.

Disk drive systems conventionally use an actuator arm to move a transducing head to a radial position on a magnetic disk. A position control loop is used to read the actual radial position of the head and compare it to the desired position, which generates a position error signal. This position error signal is used to generate a command to move the head to the correct position.

In order to move the head, a servo controller is provided to convert the position error signal generated by a position control loop into a current command for controlling a current control loop to drive the disk drive actuator motor to move the head. The current control loop includes an error amplifier which compares a desired actuator motor current to an actual actuator motor current, and controls the current delivered to the actuator motor accordingly. The error amplifier is typically configured with a single ended operational amplifier as part of an actuator motor controller on an integrated circuit, with three discrete resistors and two discrete capacitors. The error amplifier is implemented to have a pole in its response at a frequency of zero, and also to have a zero in its response. The zero in the response of the error amplifier is created by one of the resistors and one of the capacitors. Often a second pole is also desirable in the response of the amplifier/controller, to improve the rise time of the response and to improve noise performance. The second pole is created by the same resistor that creates the zero in the response, and by the two capacitors.

While the error amplifier configured with a single ended operational amplifier has provided effective response characteristics for controlling the position of the head, the necessity for discrete components requires extra pins in the integrated circuit package, which can increase packaging costs, and requires additional printed circuit board space to implement the discrete components externally, which is undesirable since space is at a premium for the increasingly small disk drives currently in production. These problems would be magnified even further if the circuit were to be built differentially, which could improve the power supply rejection ratio (PSRR) of the circuit. There is a need in the art for an error amplifier and compensation circuit that may be realized in an integrated circuit while providing the high performance response characteristics needed to effectively control the current provided to the actuator motor to position the head in the disk drive system.

BRIEF SUMMARY OF THE INVENTION

The present invention is an error amplifier for use in a disk drive actuator system having an actuator motor for radially positioning a transducing head with respect to a rotatable disk. The error amplifier includes a switched-capacitor proportional-integral controller for comparing first and second differential input signals representing a respective actual current and commanded current for driving the actuator motor, and providing a differential output signal. A transconductor-capacitor filter is connected to filter the differential output signal of the switched-capacitor proportional-integral controller, and provides a motor control signal to control the actuator motor.

DETAILED DESCRIPTION

Figure 1:
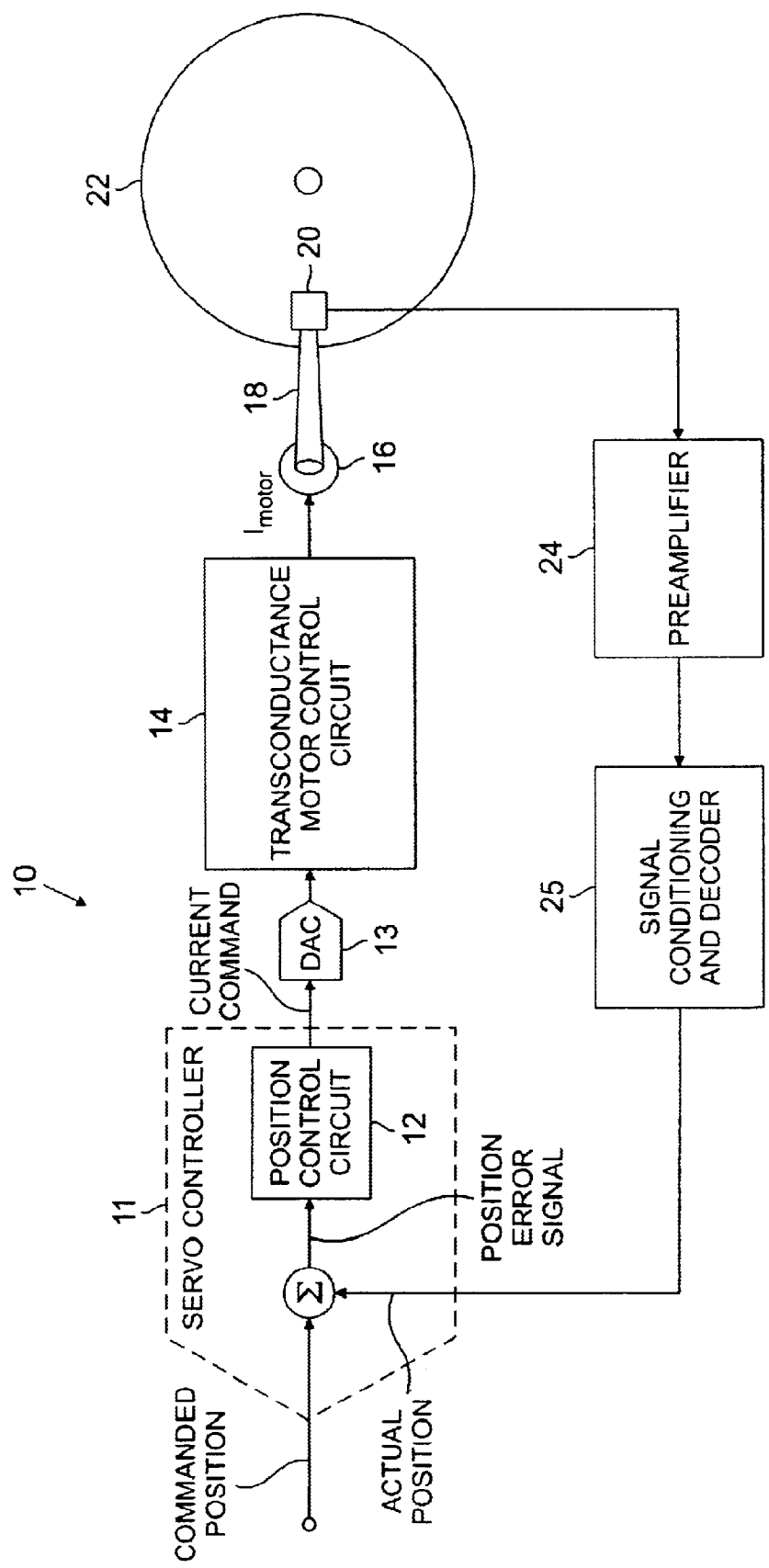
FIG. 1 is a block diagram of a typical disk drive actuator control system.

FIG. 1 is a block diagram of a typical disk drive actuator system 10. Disk drive actuator system 10 includes a servo controller 11, a position control circuit 12, a digital-to-analog converter (DAC) 13, a transconductance motor control circuit 14, a motor 16, an actuator arm 18, a transducing head 20, a disk 22, a preamplifier 24 and a signal conditioning and decoder circuit 25. Disk drive actuator system 10 is operable to move transducing head 20 to a radial position on disk 22. A position control loop is used to read the actual radial position of the head and compare it to a desired position, which produces a position error signal. The position error signal is used to produce a current to drive actuator motor 16 to move head 20 supported by actuator arm 18 to the desired position.

Disk 22 includes a plurality of concentric tracks on which data and position information is recorded. Head 20 is operable to read the data and position information from the tracks of disk 22 and generate an input signal representative of the data and position information. The input signal is amplified by preamplifier 24 and filtered and decoded by signal conditioning and decoder circuit 25 to produce a digital signal that indicates the actual position of head 20 with respect to the tracks of disk 22.

Servo controller 11 receives a digital signal Commanded Position identifying the desired track location of head 20, and also receives a digital signal Actual Position from signal conditioning and decoder circuit 25 identifying the actual track location of head 20. Servo controller 11 compares digital signal Commanded Position to digital signal Actual Position, and generates Position Error Signal, which is operated on by position control circuit 12 to create digital signal Current Command for controlling the movement of head 20 to the desired track location. Digital signal Current Command is converted to an analog control signal by DAC 13, which is input to transconductance motor control circuit 14.

Transconductance motor control circuit 14 controls the current that drives motor 16 to move head 20 to the desired track location. Transconductance motor control circuit 14 receives an analog current command signal in the form of a voltage from DAC 13, and provides a current Imotor corresponding to the current command to motor 16 to move head 20 to the desired track location.

Figure 2:
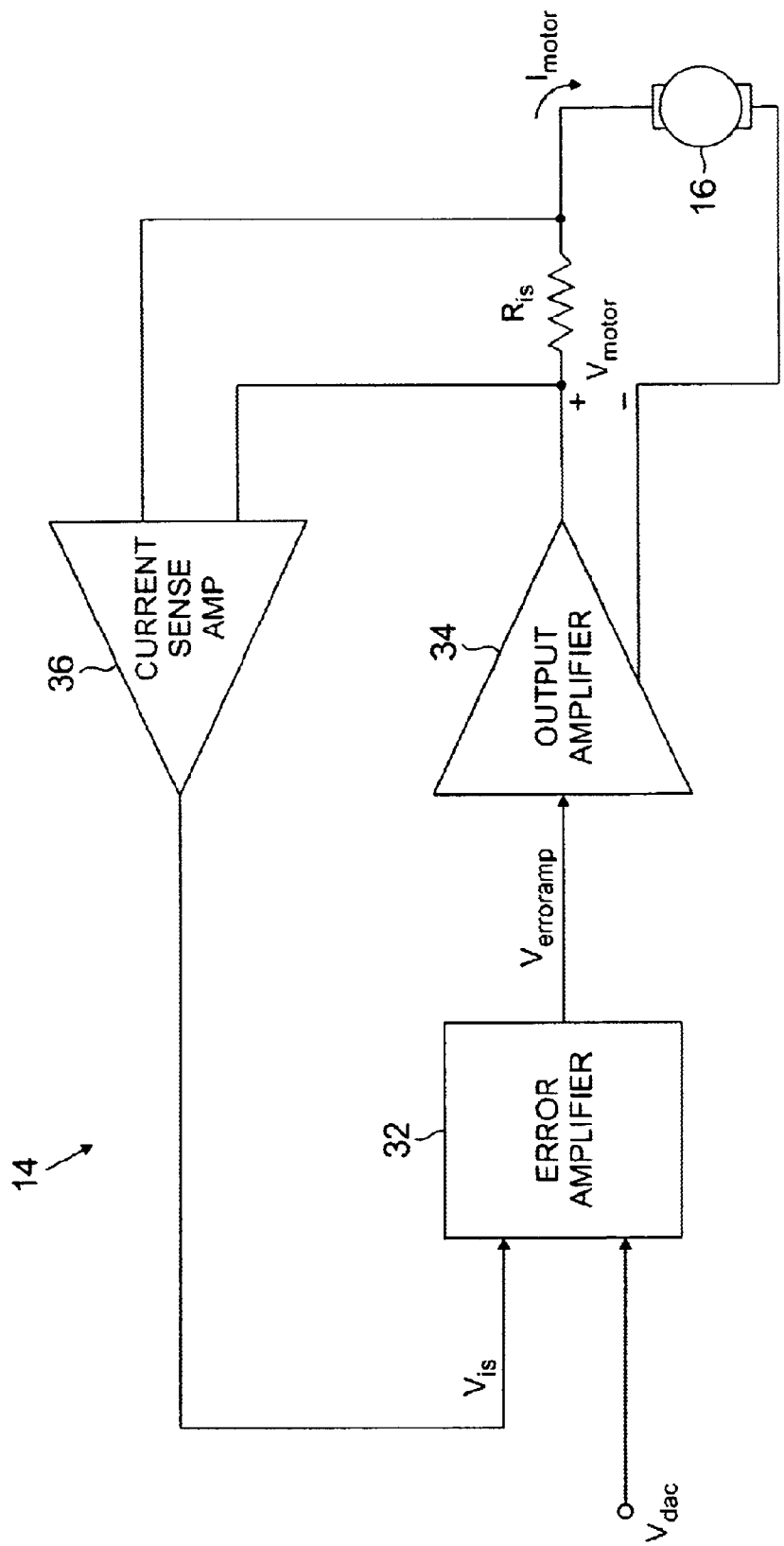
FIG. 2 is a block diagram of a typical motor control circuit of a disk drive actuator control system.

FIG. 2 is a block diagram of typical transconductance motor control circuit 14 of disk drive actuator system 10. A transconductance control loop is used to measure the current to actuator motor 16 as a voltage and compare it to an analog voltage representing the current command signal. Transconductance motor control circuit 14 includes an error amplifier 32, an output amplifier 34, a current sense amplifier 36, and a resistor Ris.

Error amplifier 32 receives a voltage Vdac from digital-to-analog converter 13 (FIG. 1), and also receives a voltage Vis from current sense amplifier 36. Current sense amplifier 36 measures the current to motor 16 by measuring the voltage drop across a small resistor Ris, which is connected in series with motor 16. Current sense amplifier 36 then amplifies the voltage drop across resistor Ris and provides a voltage Vis to error amplifier 32. Error amplifier 32 compares voltage Vis to voltage Vdac, and provides a voltage Verroramp which represents the voltage that will cause the difference between voltages Vdac and Vis to be zero.

Output amplifier 34 receives voltage Verroramp from error amplifier 32, and then amplifies voltage Verroramp to yield Vmotor which produces current motor in actuator motor 16 and resistor Ris.

Error amplifier 32 functions as a proportional-integral controller where voltage Verroramp is a linear combination of the difference between voltages Vdac and Vis and the integral of the difference between voltages Vdac and Vis. A proportional-integral controller has a zero and a pole in its frequency response. The zero is generally used to cancel the electrical pole of the motor conductance in the open-loop response. A second pole can be added to the frequency response of a proportional-integral controller, which has the advantage of giving the transconductance control loop a two-pole closed-loop frequency response. With the second pole in the closed-loop frequency response, the rise time of the step response can be increased, and the noise performance can be improved because the noise equivalent bandwidth for a given cutoff frequency can be improved. An example of a proportional-integral controller with a two-pole frequency response is shown in FIG. 3.

Figure 3:
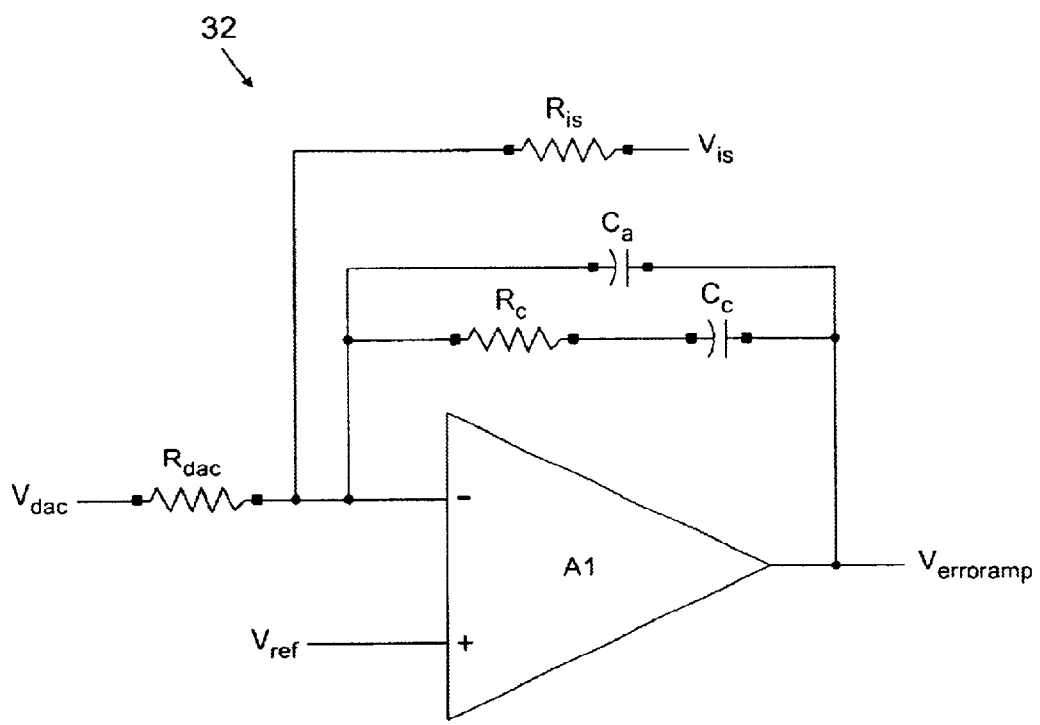
FIG. 3 is a circuit schematic diagram of a typical discrete component proportional-integral controller.

FIG. 3 is a circuit schematic diagram of a typical discrete component error amplifier 32, implemented as a proportional-integral controller. Although the present invention does not use discrete components, the proportional-integral controller shown in FIG. 3 serves as a model for explaining the theory underlying the present invention. Error amplifier (proportional-integral controller) 32 includes operational amplifier A1, capacitors Ca and Cc, resistors Rdac, Ris, and Rc, input signal nodes Vdac, Vis, and Vref, and output signal node Verroramp. Operational amplifier A1 has first (+) and second (−) input nodes, and an output node connected to output signal node Verroramp. Input signal node Vref functions as a virtual ground and is connected to the first input node of operational amplifier A1. Input signal node Vdac is connected to the second input node of operational amplifier A1 through resistor Rdac, and input signal node Vis is connected to the second input node of operational amplifier A1 through resistor Ris. Capacitor Ca is connected between the second input node and the output node of operational amplifier A1. Resistor Rc and capacitor Cc are connected in series between the second input node and the output node of operational amplifier A1.

The proportional-integral controller operates in a manner generally known in the art, operating on an input signal and an integral component of the input signal to provide an output signal for controlling the operation of the disk drive motor in a manner that will cause the current through the actuator motor to correspond to the commanded current. The frequency response of the proportional-integral controller includes a second pole, due to the configuration of Ca, Rc, and Cc.

The proportional-integral controller shown in FIG. 3, however, has several disadvantages. Using integrated resistors and capacitors to build a proportional-integral controller makes its production in integrated circuit form extremely difficult, if not practically impossible. This is because of the need for large-valued capacitors and/or large-valued resistors to meet the requirement of accurate RC time constants. Using external components requires extra pins for the integrated circuit package, which increases packaging costs. External discrete components also require additional printed circuit board space, and if the same motor controller is to be used in different types of disk drive actuator systems, then different discrete parts may be required to achieve the necessary closed-loop response adding further expense. Furthermore, implementing external discrete components as a differential circuit would require twice as many pins and discrete components as a single-ended solution.

Error amplifier (proportional-integral controller) 32 has the transfer function:

$$V_{erroramp}(s) = \left[-\frac{1}{R_{is}}V_{is}(s) - \frac{1}{R_{dac}}V_{dac}(s)\right]\left\{(sC_cR_c+1)\bigg/\left[s\left(s\frac{C_aC_c}{C_a+C_c}R_c+1\right)\right]\right\} \quad \text{(Eq. 1)}$$

$$\text{Generally, } C_a << C_c, \text{ so } \frac{C_aC_c}{C_a+C_c}R_c \approx C_aR_c$$

Therefore, the transfer function can be rewritten as:

$$V_{erroramp}(s) \approx \left\{\left[-\frac{1}{R_{is}}V_{is}(s) - \frac{1}{R_{dac}}V_{dac}(s)\right]\left[\frac{(sC_cR_c+1)}{s}\right]\right\}\left\{\frac{1}{(sC_aR_c+1)}\right\} \quad \text{(Eq. 2)}$$

This new transfer function shows that an error amplifier can be split into two circuits, with each circuit providing a pole in the frequency response and one of the circuits also providing a zero. A first circuit can represent the first term:

$$\left\{\left[-\frac{1}{R_{is}}V_{is}(s) - \frac{1}{R_{dac}}V_{dac}(s)\right]\left[\frac{(sC_cR_c+1)}{s}\right]\right\} \quad \text{(Eq. 3)}$$

And a second circuit can represent the second term:

$$\left\{\frac{1}{(sC_aR_c+1)}\right\} \quad \text{(Eq. 4)}$$

The first circuit can be realized in integrated circuit form with a switched-capacitor proportional-integral controller. The switched-capacitor technique is based on the realization that a capacitor switched between two circuit nodes at a sufficiently high rate is equivalent to a resistor connecting these two nodes. The second circuit can also be realized in integrated circuit form with a transconductor-capacitor low-pass filter. However, instead of using capacitors in the second circuit, the gate oxide capacitances of NMOS transistors can be used. Therefore, it is possible for a newly designed error amplifier to include both circuits in an integrated circuit design.

Figure 4:
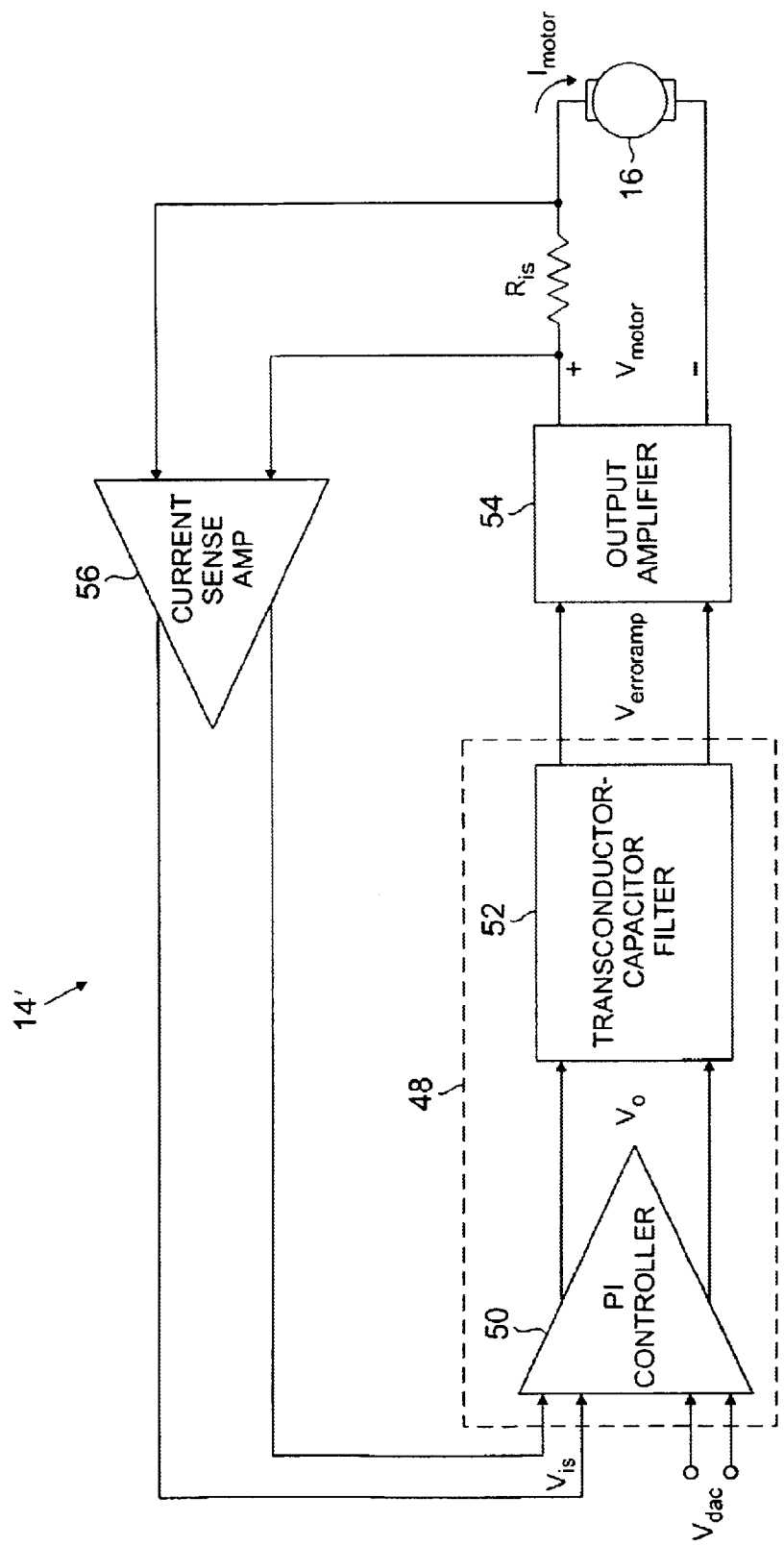
FIG. 4 is a block diagram of motor controller employing an error amplifier according to the present invention.

FIG. 4 is a block diagram of a transconductance motor control circuit 14' employing error amplifier 48 according to the present invention. Transconductance motor control circuit 14' includes a proportional-integral controller 50 and a transconductor-capacitor filter 52 making up error amplifier 48, an output amplifier 54, a current-sense amplifier 56 and a resistor Ris.

Proportional-integral controller 50 is a fully differential proportional-integral controller with one pole and one zero in its frequency response. A fully differential proportional-integral controller with common mode feedback provides better power supply rejection than a single-ended proportional-integral controller. Proportional-integral controller 50 receives a differential voltage Vdac representing the current command signal, receives a differential voltage Vis from current sense amplifier 56, and provides a differential voltage Vo to transconductor-capacitor filter 52.

Transconductor-capacitor filter 52 is a differential transconductor-capacitor low-pass filter with one pole in its frequency response. Transconductor-capacitor filter 52 may be constructed as is generally known in the art, and is operable to receive differential voltage Vo from proportional-integral controller 50 and provide a differential motor control signal Verroramp according to the following equation:

$$\frac{V_{erroramp}}{V_o} = \left(\frac{sC}{Gm}+1\right)^{-1} \quad \text{(Eq. 5)}$$

where C is the value of the capacitor in the filter and Gm is the gain of the transconductor in the filter.

Figure 5:
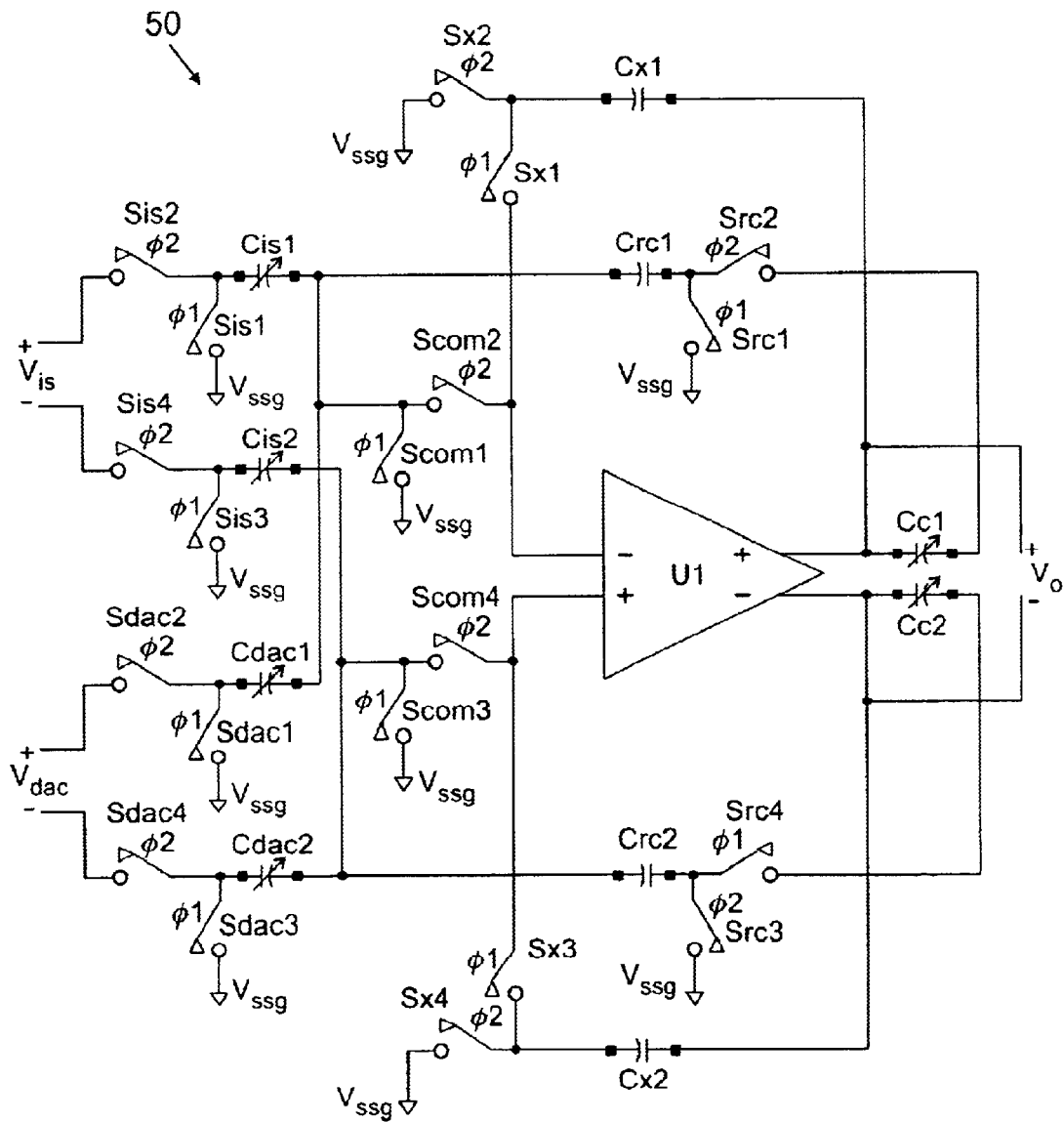
FIG. 5 is a circuit schematic diagram of a proportional-integral controller of the error amplifier of the present invention.

FIG. 5 is a circuit schematic diagram of proportional-integral controller 50 of error amplifier 48 of the present invention. Proportional-integral controller 50 includes input signal nodes Vis+, Vis−, Vdac+, and Vdac−, switches Sis1–Sis4, Sdac1–Sdac4, Scom1–Scom4, Sx1–Sx4, and Src1–Src4, capacitors Cis1, Cis2, Cdac1, Cdac2, Cx1, Cx2, Crc1, Crc2, Cc1, and Cc2, differential operational amplifier U1, output signal nodes Vo+ and Vo−, and fixed potential Vssg, which is the small-signal ground reference voltage of the circuit. Differential operational amplifier U1 has first and second input nodes and first and second output nodes.

Switch Sis2 is connected between input signal node Vis+ and capacitor Cis1, and switch Sis4 is connected between input signal node Vis− and capacitor Cis2. Switch Sdac2 is connected between input signal node Vdac+ and capacitor Cdac1, where capacitor Cdac1 is connected to capacitor Cis1. Switch Sdac4 is connected between input signal node Vdac− and capacitor Cdac2, where capacitor Cdac2 is connected to capacitor Cis2. Switch Sis1 is connected between switch Sis2 and fixed potential Vssg, switch Sis3 is connected between switch Sis4 and fixed potential Vssg, switch Sdac1 is connected between switch Sdac2 and fixed potential Vssg, and switch Sdac3 is connected between switch Sdac4 and fixed potential Vssg. Switch Scom2 is connected between capacitor Cis1 and the second input node of differential operational amplifier U1, and switch Scom4 is connected between capacitor Cis2 and the first input node of differential operational amplifier U1. Switch Scom1 is connected between capacitor Cis1 and fixed potential Vssg, and switch Scom3 is connected between capacitor Cis2 and fixed potential Vssg. Switch Sx1 is connected between the second input node of differential operational amplifier U1 and capacitor Cx1, where capacitor Cx1 is connected to the first output node of differential operational amplifier U1. Switch Sx3 is connected between the first input node of differential operational amplifier U1 and capacitor Cx2, where capacitor Cx2 is connected to the second output node of differential operational amplifier U1. Switch Sx2 is connected between switch Sx1 and fixed potential Vssg, and switch Sx4 is connected between switch Sx3 and fixed potential Vssg. Switch Src2 is connected between capacitors Crc1 and Cc1, where capacitors Crc1 and Cc1 are connected respectively to capacitor Cis1 and the first output node of differential operational amplifier U1. Switch Src4 is connected between capacitors Crc2 and Cc2, where capacitors Crc2 and Cc2 are connected respectively to capacitor Cdac2 and the second output node of differential operational amplifier U1. Switch Src1 is connected between capacitor Crc1 and fixed potential Vssg, and switch Src3 is connected between capacitor Crc2 and fixed potential Vssg. The first and second output nodes of differential operational amplifier U1 are connected respectively to output signal nodes Vo+ and Vo−.

In operation, two non-overlapping clock phases Φ1 and Φ2 exist for proportional-integral controller 50. During clock phase Φ1, switches Sis1, Sis3, Sdac1, Sdac3, Scom1, Scom3, Sx1, Sx3, Src1, and Src3 are turned on, and switches Sis2, Sis4, Sdac2, Sdac4, Scom2, Scom4, Sx2, Sx4, Src2, and Src4 are turned off. Switches Sis1 and Scom1 function to discharge capacitor Cis1, and switches Sis3 and Scom3 discharge capacitor Cis2. Similarly, switches Sdac1 and Scom1 discharge capacitor Cdac1, and switches Sdac3 and Scom3 discharge capacitor Cdac2. In addition, switches Src1 and Scom1 discharge capacitor Crc1, and switches Src3 and Scom3 discharge capacitor Crc2. Also during clock phase Φ1, switch Sx1 connects capacitor Cx1 to the second input node of differential operational amplifier U1, and switch Sx3 connects capacitor Cx2 to the first input node of differential operational amplifier U1. Because capacitors Cx1 and Cx2 are connected between the output nodes and input nodes of differential operational amplifier U1, the first and second output nodes of differential operational amplifier U1 are held respectively to the voltages that were stored in capacitors Cx1 and Cx2 during the previous clock phase Φ2.

During clock phase Φ2, switches Sis2, Sis4, Sdac2, Sdac4, Scom2, Scom4, Sx2, Sx4, Src2, and Src4 are turned on, and switches Sis1, Sis3, Sdac1, Sdac3, Scom1, Scom3, Sx1, Sx3, Src1, and Src3 are turned off. Switches Sis2 and Sis4 connect input signal nodes Vis+ and Vis− to capacitors Cis1 and Cis2 respectively. The voltages at input signal nodes Vis+ and Vis− cause currents to flow to and charge capacitors Cis1 and Cis2. Switches Sdac2 and Sdac4 connect input signal nodes Vdac+ and Vdac− to capacitors Cdac1 and Cdac2 respectively. The voltages at input signal nodes Vdac+ and Vdac− cause currents to flow to and charge capacitors Cdac1 and Cdac2. The currents through capacitors Cis1 and Cdac1 are summed, and connected to the second input node of differential operational amplifier U1 through switch Scom2. The currents through capacitors Cis2 and Cdac2 are summed, and connected to the first input node of differential operational amplifier U1 though switch Scom4. Ideally, differential operational amplifier U1 has infinite input impedance, so the sum of the currents that flow through capacitors Cis1 and Cdac1 also flows through capacitors Crc1 and Cc1. Therefore, the sum of the charges in capacitors Cis1 and Cdac1 is added to capacitors Crc1 and Cc1. Similarly, the sum of the currents that flow through capacitors Cis2 and Cdac2 also flows through capacitors Crc2 and Cc2. Therefore, the sum of the charges in capacitors Cis2 and Cdac2 is added to capacitors Crc2 and Cc2.

The output taken at output signal nodes Vo+ and Vo− is a function of the charges stored in capacitors Crc1, Crc2, Cc1, and Cc2. Because capacitors Crc1 and Crc2 are discharged every Φ1 clock phase, their contributions to the output are related to the inputs at input signal nodes Vis+, Vis−, Vdac+, and Vdac− for a given Φ2 clock phase period. These contributions provide the proportional term. Capacitors Cc1 and Cc2 are not discharged, therefore their contributions provide the integral term by integrating (summing) the previous charges during the Φ2 clock phase. The output at output signal nodes Vo+ and Vo− is discrete in time because of the switching nature of the circuit. Therefore, the transfer function of proportional-integral controller 50 can be accurately defined in the z-domain:

$$V_o(z) = -[C_{dac}V_{dac}(z) + C_{is}V_{is}(z)]\left[\left(\frac{C_{rc}+C_c}{C_{rc}C_c}z - \frac{1}{C_{rc}}\right)\bigg/(z-1)\right] \quad \text{(Eq. 6)}$$

where:
  Cis=Cis1=Cis2,
  Cdac=Cdac1=Cdac2,
  Crc=Crc1=Crc2, and
  Cc=Cc1=Cc2.

Because proportional-integral controller 50 is intended for use in different disk drive actuator systems, proportional-integral controller 50 is programmable to provide a variety of responses. The periods of clock phases Φ1 and Φ2 are programmable, as well as the value of capacitors Cis1, Cis2, Cdac1, Cdac2, Cc1, and Cc2, by techniques generally known in the art.

Figure 6:
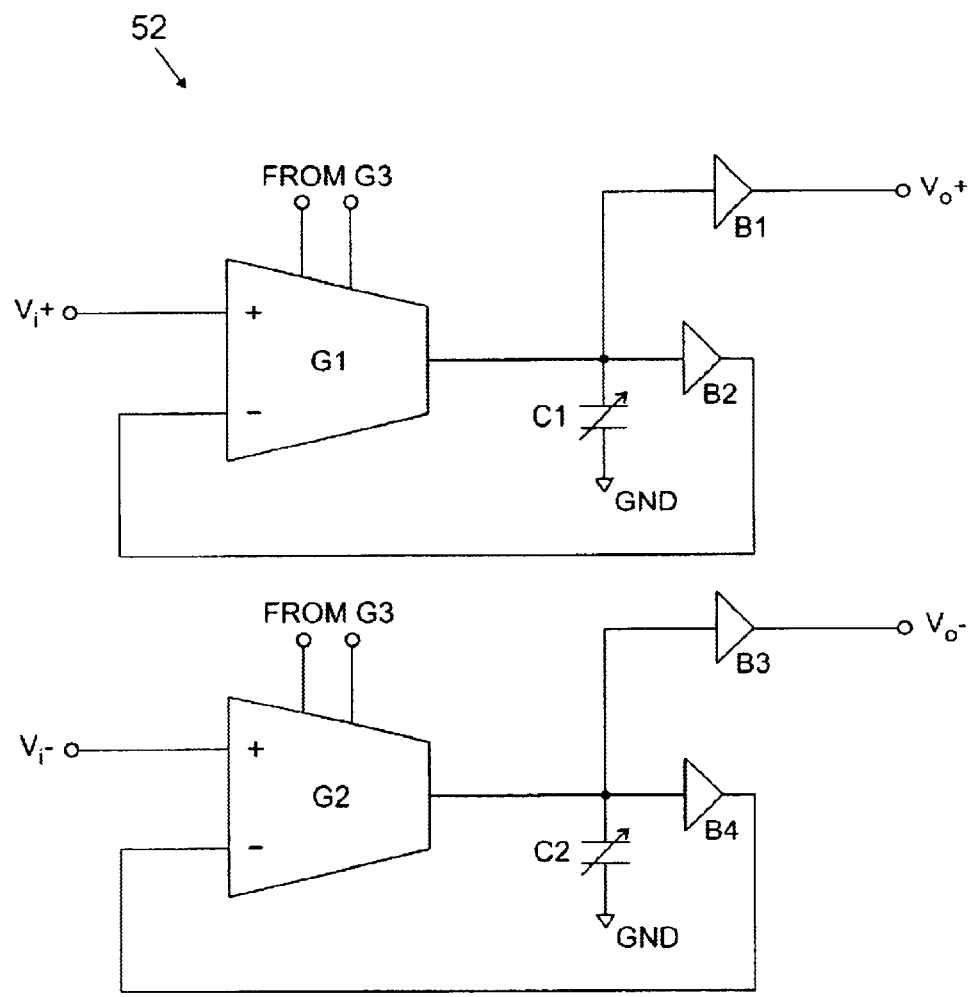
FIG. 6 is a circuit schematic diagram of a transconductor-capacitor filter of the error amplifier of the present invention.

FIG. 6 is a circuit schematic diagram of transconductor-capacitor filter 52 of error amplifier 48 of the present invention. Transconductor-capacitor filter 52 includes input signal nodes Vi+ and Vi−, transconductance cells G1 and G2, capacitors C1 and C2, buffers B1, B2, B3 and B4, output signal nodes Vo+ and Vo−, and fixed potential GND. Transconductance cells G1 and G2 are each transconductors having first and second input nodes and an output node. Bias currents for transconductance cells G1 and G2 are generated by a transconductor reference circuit G3 described later and shown in FIG. 8. Input signal nodes Vi+ and Vi− are connected respectively to the first input nodes of transconductance cells G1 and G2. The output nodes of transconductance cells G1 and G2 are connected through buffers B1 and B3, respectively, to output signal nodes Vo+ and Vo−. The output node of transconductance cell G1 is connected through buffer B2 to the second input node of transconductance cell G1, and the output node of transconductance cell G2 is connected through buffer B4 to the second input node of transconductance cell G2. The output node of transconductance cell G1 is connected through capacitor C1 to fixed potential GND and the output node of transconductance cell G2 is connected through capacitor C2 to fixed potential GND. In the configuration shown in FIG. 6, transconductor-capacitor filter 52 is a pseudo-differential realization of a low-pass filter.

In order to keep the capacitor area of transconductor-capacitor filter 52 to a minimum, the transconductance of transconductance cells G1 and G2 need to be low. To attain a low transconductance, a differential pair with floating voltage sources can be used, where the floating voltage sources are implemented with source followers. These floating voltage sources reduce the overall transconductance for a given bias current. Furthermore, the floating voltage sources give the transconductance a linear response over a large dynamic range. Such a transconductance cell is shown in FIG. 7.

Figure 7:
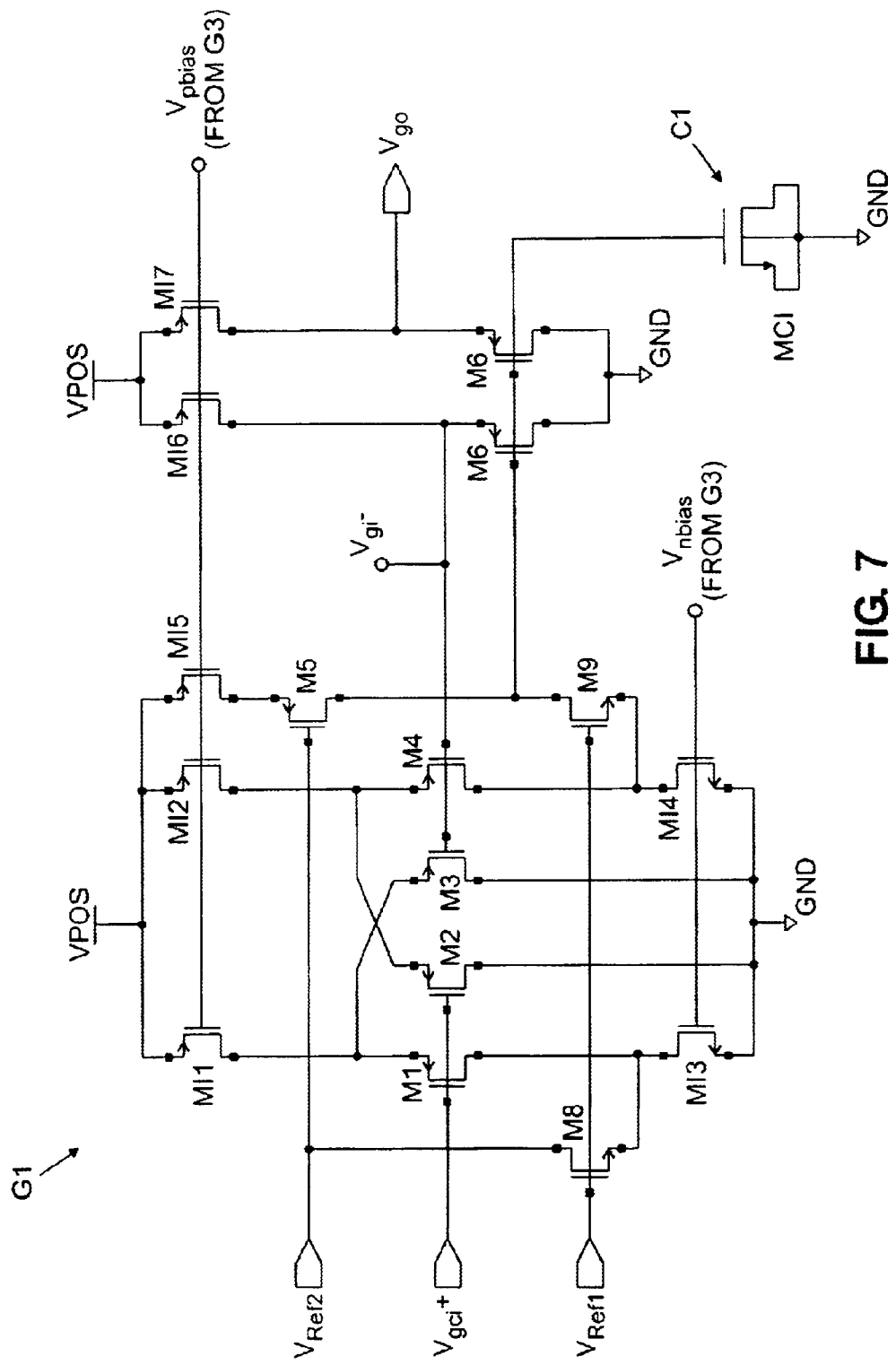
FIG. 7 is a circuit schematic diagram of a transconductance and capacitance cell of the transconductor-capacitor filter of the present invention.

FIG. 7 is a circuit schematic diagram of transconductance cell G1 (which is identical to transconductance cell G2) and capacitance C1 (which is identical to capacitance C2) of transconductor-capacitor filter 52. Transconductance cell G1 includes transistors M1–M9, current source transistors MI1–MI7, a capacitor realized by transistor MC1, input signal nodes Vgi+ and Vgi−, input bias nodes Vref1 and Vref2, output signal node Vgo, and fixed potentials VPOS and GND. Transistors M1–M7 and current mirror transistors MI1, MI2, and MI5–MI7 are PMOS transistors each having a gate, a source, and a drain. Transistors M8 and M9 and current mirror transistors MI3 and MI4 are NMOS transistors each having a gate, a source, and a drain. The gates of current source transistors MI1, MI2, and MI5–MI7 are each biased by a signal provided at node Vpbias by transconductance cell G3 (shown in FIG. 8) of transconductor-capacitor filter 52. The gates of current source transistors MI3 and MI4 are biased by a signal provided at node Vnbias by transconductance cell G3 (FIG. 8) of transconductor-capacitor filter 52. Input signal node Vgi+ is connected to the gates of transistors M1 and M2, and input signal node Vgi− is connected to the gates of transistors M3 and M4 and the source of transistor M6. Current mirror transistor MI1 has its source connected to fixed potential VPOS, and its drain connected to the sources of transistors M1 and M3. Current mirror transistor MI2 has its source connected to fixed potential VPOS, and its drain connected to the sources of transistors M2 and M4. Current mirror transistor MI3 has its drain connected to the drain of transistor M1, and its source connected to fixed potential GND. Current mirror transistor MI4 has its drain connected to the drain of transistor M4, and its source connected to fixed potential GND. The drains of transistors M2 and M3 are each connected to fixed potential GND. Input bias node Vref1 is connected to the gates of transistors M8 and M9, and input bias node Vref2 is connected to the gate of transistor M5 and the drain of transistor M8. Current mirror transistor MI5 has its source connected to fixed potential VPOS, and its drain connected to the source of transistor M5. The drain of transistor M5 is connected to the drain of transistor M9. The sources of transistors M8 and M9 are connected respectively to the drains of transistors M1 and M4. The gates of transistors M6 and M7 are connected to the drain of transistor M9, and transistor MC1 is connected between the gate of transistor M7 and fixed potential GND to realize capacitor C1. Transistor MC1 is an NMOS transistor having a gate, a source, a body and a drain, with the gate connected to the gate of transistor M7 and the source, body and drain all connected to fixed potential GND. Transistor MC1 is used instead of a discrete capacitors because when NMOS transistors are biased far above a threshold voltage so that their channels are fully depleted, they provide a nearly constant capacitance over the input voltage range. In addition, NMOS transistors may also provide a larger capacitance per unit area than a discrete capacitor, and the dependence of capacitance on oxide thickness can be removed through proper implementation of a reference cell. Therefore, capacitor C1 can be realized by transistor MC1 as shown in FIG. 7, which is more suitable for fabrication in an integrated circuit. Current mirror transistor MI6 has its source connected to fixed potential VPOS, and its drain connected to the source of transistor M6. Current mirror transistor MI7 has its source connected to fixed potential VPOS, and its drain connected to the source of transistor M7. The drains of transistors M6 and M7 are each connected to fixed potential GND. Output signal node Vgo is connected to the source of transistor M7.

Transistors M1 and M4 form a differential pair and have identical widths and lengths. Transistors M2 and M3 are floating voltage sources and also have identical widths and lengths. The ratios of width to length for transistors M1–M4 are nW1/L1=W2/L2=W3/L3=nW4/L4, where a larger constant n helps reduce the transconductance of differential pair M1 and M4. To further reduce transconductance, transistors M1–M4 are PMOS transistors instead of NMOS transistors because the hole mobility of PMOS transistors is less than the electron mobility of NMOS transistors.

Transistors M8 and M9 are folded cascode devices that are used to increase signal dynamic range, increase output impedance and reduce loading of the output. Current mirror transistor MI5 has transistor M5 as a cascode device to reduce the capacitive loading of the transconductance output of transistor M9. The current of transistor M8 is not used, which farther reduces the effective transconductance. Because the output current of transistor M8 is not used, a pseudo-differential structure utilizing dual transconductors and capacitors as shown in FIG. 6 is needed to realize the desired linear response over the differential range. The transconductance output of transistor M9 is connected to transistor MC1 to give the desired frequency response.

Transistors M6 and M7 are source followers that function as buffers at the transconductance output of transistor M9. The source of transistor M6 is an output connected to input signal node Vgi−. Transistor M6 improves the frequency response because without transistor M6, the capacitances of transistors M3 and M4 would load capacitor C1 (realized by transistor MC1). The source of transistor M7 is connected to output signal node Vgo. Transistor M7 reduces capacitive feed through from input signal node Vgi+ to output signal node Vgo through the large gate-to-source capacitances of transistors M1–M4.

The gate oxide capacitances in transconductance cell G1 are a function of oxide thickness. Therefore the performance (cutoff frequency) of transconductance cell G1 is a function of oxide thickness. It is generally undesirable for manufacturing variances to dictate the performance of transconductance cells G1 and G2. To solve this potential problem, transconductance cell G3 is configured not only to provide bias currents to transconductance cells G1 and G2, but also to eliminate their sensitivity to oxide thickness.

Figure 8:
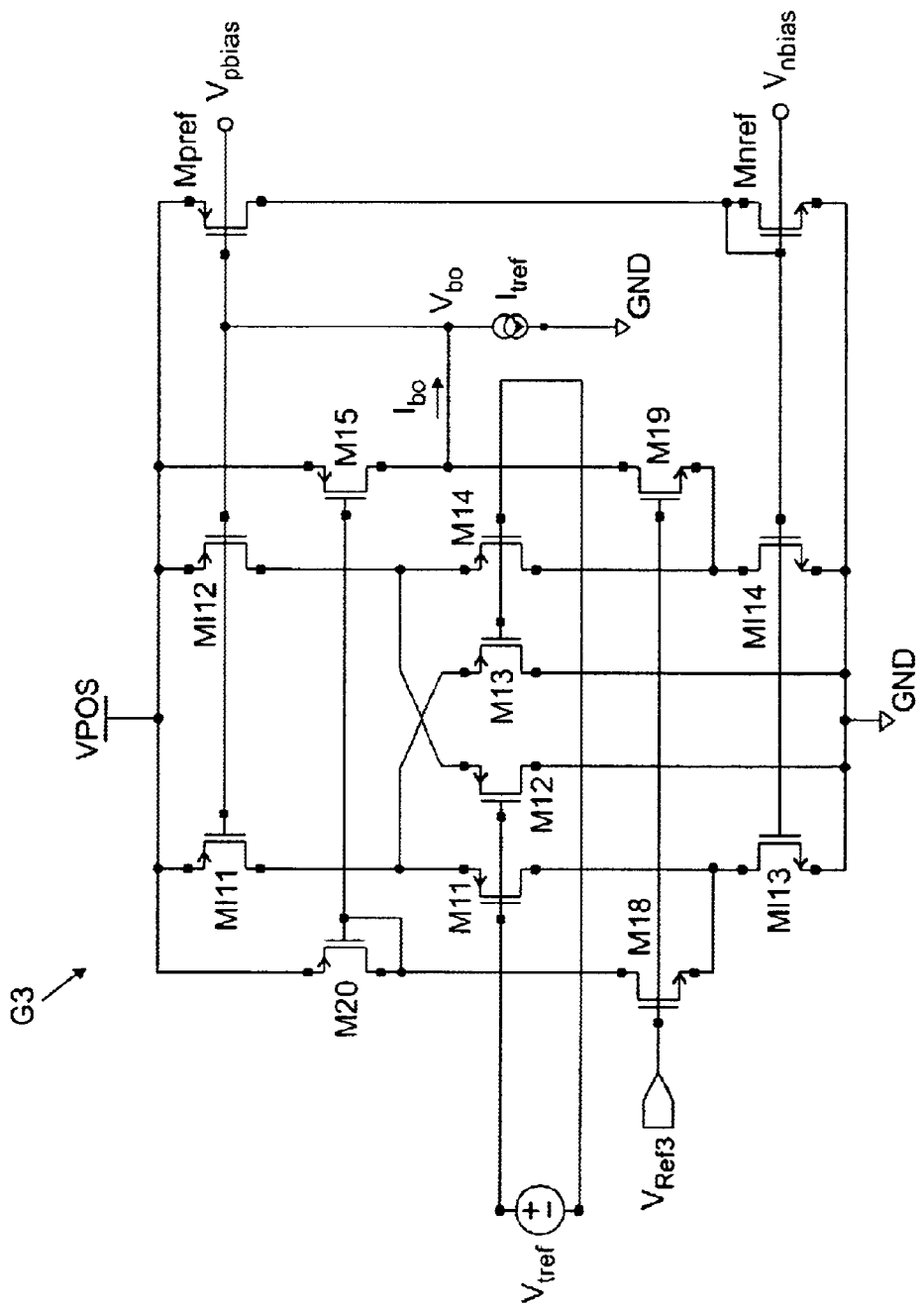
FIG. 8 is a circuit schematic diagram of a transconductor reference biasing circuit of the transconductor-capacitor filter of the present invention.

FIG. 8 is a circuit schematic diagram of transconductance cell G3 of transconductor-capacitor filter 52. Transconductance cell G3 includes transistors M11–M15 and M18–M20, current mirror transistors MI11–MI14, bias transistors Mpref and Mnref, a zero temperature coefficient voltage Vtref, a current source Itref, an input bias node Vref3, an output signal node Vbo, and fixed potentials VPOS and GND. Transistors M11–M15 and M20, current mirror transistors MI11 and MI12, and bias transistor Mpref are PMOS transistors each having a gate, a source, and a drain. Transistors M18 and M19, current mirror transistors MI13 and MI14, and bias transistor Mnref are NMOS transistors each having a gate, a source, and a drain. Current source Itref is a reference current source that is a function of oxide thickness. Zero temperature coefficient voltage Vtref has a positive node connected to the gates of transistors M11 and M12, and a negative node connected to the gates of transistors M13 and M14. Current mirror transistor MI11 has its source connected to fixed potential VPOS, and its drain connected to the sources of transistors M11 and M13. Current mirror transistor MI12 has its source connected to fixed potential VPOS, and its drain connected to the sources of transistors M12 and M14. Current mirror transistor MI13 has its drain connected to the drain of transistor M11, and its source connected to fixed potential GND. Current mirror transistor MI14 has its drain connected to the drain of transistor M14, and its source connected to fixed potential GND. The drains of transistors M12 and M13 are each connected to fixed potential GND. Input bias node Vref3 is connected to the gates of transistors M18 and M19, and the sources of transistors M18 and M19 are connected respectively to the drains of current mirror transistors MI13 and MI14. Transistor M20 has its source connected to fixed potential VPOS, its gate connected to its drain, and its drain connected to the drain of transistor M18. Transistor M15 has its source connected to fixed potential VPOS, its gate connected to the gate of transistor M20, and its drain connected to the drain of transistor M19 and output signal node Vbo. Output signal node Vbo is connected to the gates of current mirror transistors MI11 and MI12, as well as the gate of bias transistor Mpref. Bias transistor Mpref has its source connected to fixed potential VPOS, and its drain connected to the drain of bias transistor Mnref. Bias transistor Mnref has its drain connected to its gate, its gate connected to the gates of current mirror transistors MI13 and MI14, and its source connected to fixed potential GND. Current source Itref is connected between output signal node Vbo and fixed potential GND. The gate of transistor Mpref is connected to biasing output node Vpbias, and the gate of transistor Mnref is connected to biasing output node Vnbias.

Transistors M11–M14 in transconductance cell G3 are identical in width and length to transistors M1–M4 in transconductance cell G1. Similar to the configuration described above with respect to FIG. 7, transistors M18 and M19 are folded cascode devices. The output drain current from transistor M18 is input into the mirror formed by transistors M20 and M15. The output drain current of transistor M19 is subtracted from the output drain current of transistor M15, and this difference is the output current Ibo of transconductance circuit G3. Negative feedback is employed from output signal Vbo to bias the gates of transistors MI11, MI12 and Mpref. Mpref in turn feeds current into the mirror formed by transistors MI13, MI14 and Mnref. The circuit is properly biased when output current Ibo is equal to the current of reference current source Itref. The gate voltages of transistors Mpref and Mnref are used to bias the gates of current mirror transistors MI1–MI7 of transconductance cell G1 shown in FIG. 7 (which is identical to transconductance cell G2 also shown in block diagram form in FIG. 6). Also, when output current Ibo of transconductance cell G3 is equal to the current of reference current source Itref, then the transconductance of transconductance cell G3 is a linear function of oxide thickness, since:

$$G_m(T_{ox}) = \frac{I_{tref}(T_{ox})}{V_{tref}} \quad \text{(Eq. 7)}$$

Because the gate voltages of transistors Mpref and Mnref are shared between transconductance reference cell G3 and transconductance filter cells G1 and G2, the transconductances of all three transconductance cells G1–G3 are a function of oxide thickness. Since the capacitors of the filter circuit are also MOS devices, they have properties that are also a linear function of the same oxide thickness. The cutoff frequency of transconductance cells G1 and G2 is defined by:

$$\omega = \frac{G_m(T_{ox})}{C(T_{ox})} \quad \text{(Eq. 8)}$$

Since the dependence of both transconductance and capacitance on the oxide thickness is linear, the dependence on oxide thickness cancels out of the equation, so that the cutoff frequency of the circuit is relatively insensitive to oxide thickness, as well as to temperature and other process parameters.

The present invention therefore provides a newly designed error amplifier for use in a disk drive actuation system that may be realized in an integrated circuit while providing the high performance response characteristics needed to effectively control the current that drives the actuator motor to position the head in the disk drive. The error amplifier and compensation circuit of the present invention eliminates the need for large-valued integrated resistors and/or capacitors which have traditionally made implementation in an integrated circuit prohibitive and which have typically been implemented as discrete components, which was problematic due to the necessity for extra pins and the inefficient usage of printed circuit board space, which is at a premium in such systems. The circuit of the present invention achieves this with two main circuit portions. A switched-capacitor proportional-integral controller compares differential input signals representing the actual current through the actuator motor and the commanded current, and generates a control signal for driving the actuator motor with the proper current. The control signal is input to a transconductor-capacitor filter which filters the discrete time proportional-integral controller output, provides a second pole in the overall transconductance response, and provides a motor control signal to control the actuator motor. Both the switched-capacitor proportional-integral controller and the transconductor-capacitor filter are readily fabricated in an integrated circuit, which is desirable to save space and expense in the disk drive system.

Although the present invention has been described with reference to preferred embodiments, workers skilled in the art will recognize that changes may be made in form and detail without departing from the spirit and scope of the invention.

What is claimed is:

1. An integrated circuit error amplifier for use in a disk drive actuator system having an actuator motor for radially positioning a transducing head with respect to a rotatable disk, the error amplifier comprising:
    a switched-capacitor proportional-integral controller for comparing first and second differential input signals representing a respective actual current and a commanded current for driving the actuator motor, and providing a differential output signal; and
    a transconductor-capacitor filter for filtering the differential output signal of the switched-capacitor proportional-integral controller and providing a motor control signal to control the actuator motor.

2. The error amplifier of claim 1 wherein the switched-capacitor proportional-integral controller includes:
    first, second, third, and fourth input signal nodes;
    first and second output signal nodes;
    a differential operational amplifier having first and second input nodes and first and second output nodes, the first and second output nodes being connected respectively to the first and second output signal nodes;
    a first switch connected between the first input signal node and a first capacitor;
    a second switch connected between the first switch and ground;
    a third switch connected between the second input signal node and a second capacitor;
    a fourth switch connected between the third switch and ground;
    a fifth switch connected between the third input signal node and a third capacitor, the third capacitor being connected to the first capacitor;
    a sixth switch connected between the fifth switch and ground;
    a seventh switch connected between the fourth input signal node and a fourth capacitor, the fourth capacitor being connected to the second capacitor;
    an eighth switch connected between the seventh switch and ground;
    a ninth switch connected between the first capacitor and the second input node of the differential operational amplifier;
    a tenth switch connected between the first capacitor and ground;
    an eleventh switch connected between the second capacitor and the first input node of the differential operational amplifier;
    a twelfth switch connected between the second capacitor and ground;
    a thirteenth switch connected between a fifth capacitor and the second input node of the differential operational amplifier, the fifth capacitor being connected to the first output node of the differential operational amplifier;
    a fourteenth switch connected between the thirteenth switch and ground;
    a fifteenth switch connected between a sixth capacitor and the first input node of the differential operational amplifier, the sixth capacitor being connected to the second output node of the differential operational amplifier;
    a sixteenth switch connected between the fifteenth switch and ground;
    a seventeenth switch connected between a seventh capacitor and an eighth capacitor, the seventh capacitor being connected to the first capacitor, and the eighth capacitor being connected to the first output node of the differential operational amplifier;
    an eighteenth switch connected between the seventh capacitor and ground;
    a nineteenth switch connected between a ninth capacitor and a tenth capacitor, the ninth capacitor being connected to the fourth capacitor, and the tenth capacitor being connected to the second output node of the differential operational amplifier; and
    a twentieth switch connected between the ninth capacitor and ground.

3. The error amplifier of claim 1 wherein the transconductor-capacitor filter includes:
    first and second input signal nodes;
    first and second output signal nodes;
    a first transconductor having first and second input nodes and an output node, the first input node being connected to the first input signal node, the second input node being coupled to the output node, and the output node being coupled to the first output signal node;
    a second transconductor having first and second input nodes and an output node, the first input node being connected to the second input signal node, the second input node being coupled to the output node, and the output node being coupled to the second output signal node;
    a first capacitor connected between the output node of the first transconductor and ground; and
    a second capacitor connected between the output node of the second transconductor and ground.

4. The error amplifier of claim 3 wherein the first capacitor comprises:
a first transistor having a gate, a source, a body and a drain, wherein the gate is connected to the output node of the first transconductor, and the source, body and drain are each connected to ground;
and the second capacitor comprises:
a second transistor having a gate, a source, a body and a drain, wherein the gate is connected to the output node of the second transconductor, and the source, body and drain are each connected to ground.

5. The error amplifier of claim 4 wherein the first and second transconductors are connected to a third transconductor for biasing the first and second transconductors.

6. The error amplifier of claim 5 wherein a first cell including the first transconductor and the first capacitor has a first cutoff frequency, wherein a second cell including the second transconductor and the second capacitor has a second cutoff frequency, and wherein the third transconductor is configured to eliminate a dependence of the first and second cutoff frequencies of the first and second cells on an oxide thickness associated with devices constituting the first and second cells.

7. The error amplifier of claim 1 wherein the switched-capacitor proportional-integral controller has a first response characteristic that includes a first pole and a zero and the transconductor-capacitor filter has a second response characteristic that includes a second pole.

8. The error amplifier of claim 7 wherein the first response characteristic of the switched-capacitor proportional-integral controller is programmable.

9. The error amplifier of claim 7 wherein the second response characteristic of the transconductor-capacitor filter is programmable.

10. A disk drive comprising:
a rotatable disk having a plurality of tracks;
an actuator system for supporting and positioning a transducing head adjacent to a selected track of the plurality of tracks, the actuator system including an actuator motor for an actuator motor for moving the transducing head with respect to the tracks of the disk;
an integrated circuit error amplifier operatively connected to the actuator motor, the integrated circuit error amplifier comprising:
a switched-capacitor proportional-integral controller for comparing first and second differential input signals representing a respective actual current and a commanded current for driving the actuator motor, and providing a differential output signal; and
a transconductor-capacitor filter for filtering the differential output signal of the switched-capacitor proportional-integral controller and providing a motor control signal to control the actuator motor.

11. The disk drive of claim 10 wherein the switched-capacitor proportional-integral controller of the error amplifier includes:
first, second, third, and fourth input signal nodes;
first and second output signal nodes;
a differential operational amplifier having first and second input nodes and first and second output nodes, the first and second output nodes being connected respectively to the first and second output signal nodes;
a first switch connected between the first input signal node and a first capacitor;
a second switch connected between the first switch and ground;
a third switch connected between the second input signal node and a second capacitor;
a fourth switch connected between the third switch and ground;
a fifth switch connected between the third input signal node and a third capacitor, the third capacitor being connected to the first capacitor;
a sixth switch connected between the fifth switch and ground;
a seventh switch connected between the fourth input signal node and a fourth capacitor, the fourth capacitor being connected to the second capacitor;
an eighth switch connected between the seventh switch and ground;
a ninth switch connected between the first capacitor and the second input node of the differential operational amplifier;
a tenth switch connected between the first capacitor and ground;
an eleventh switch connected between the second capacitor and the first input node of the differential operational amplifier;
a twelfth switch connected between the second capacitor and ground;
a thirteenth switch connected between a fifth capacitor and the second input node of the differential operational amplifier, the fifth capacitor being connected to the first output node of the differential operational amplifier;
a fourteenth switch connected between the thirteenth switch and ground;
a fifteenth switch connected between a sixth capacitor and the first input node of the differential operational amplifier, the sixth capacitor being connected to the second output node of the differential operational amplifier;
a sixteenth switch connected between the fifteenth switch and ground;
a seventeenth switch connected between a seventh capacitor and an eighth capacitor, the seventh capacitor being connected to the first capacitor, and the eighth capacitor being connected to the first output node of the differential operational amplifier;
an eighteenth switch connected between the seventh capacitor and ground;
a nineteenth switch connected between a ninth capacitor and a tenth capacitor, the ninth capacitor being connected to the fourth capacitor, and the tenth capacitor being connected to the second output node of the differential operational amplifier; and
a twentieth switch connected between the ninth capacitor and ground.

12. The disk drive of claim 10 wherein the transconductor-capacitor filter includes:
first and second input signal nodes;
first and second output signal nodes;
a first transconductor having first and second input nodes and an output node, the first input node being connected to the first input signal node, the second input node being coupled to the output node, and the output node being coupled to the first output signal node;
a second transconductor having first and second input nodes and an output node, the first input node being connected to the second input signal node, the second input node being coupled to the output node, and the output node being coupled to the second output signal node;

a first capacitor connected between the output node of the first transconductor and ground; and a second capacitor connected between the output node of the second transconductor and ground.

13. The disk drive of claim 12 wherein the first capacitor comprises:

a first transistor having a gate, a source, a body and a drain, wherein the gate is connected to the output node of the first transconductor, and the source, body and drain are each connected to ground;

and the second capacitor comprises:

a second transistor having a gate, a source, a body and a drain, wherein the gate is connected to the output node of the second transconductor, and the source, body and drain are each connected to ground.

14. The disk drive of claim 13 wherein the first and second transconductors are connected to a third transconductor for biasing the first and second transconductors.

15. The disk drive of claim 14 wherein a first cell including the first transconductor and the first capacitor has a first cutoff frequency, wherein a second cell including the second transconductor and the second capacitor has a second cutoff frequency, and wherein the third transconductor is configured to eliminate a dependence of the first and second cutoff frequencies of the first and second cells on an oxide thickness associated with devices constituting the first and second cells.

16. The disk drive of claim 10, wherein the switched-capacitor proportional-integral controller has a first response characteristic that includes a first pole and a zero and the transconductor-capacitor filter has a second response characteristic that includes a second pole.

17. The error amplifier of claim 16 wherein the first response characteristic of the switched-capacitor proportional-integral controller is programmable.

18. The error amplifier of claim 16, wherein the second response characteristic of the transconductor-capacitor filter is programmable.

* * * * *

UNITED STATES PATENT AND TRADEMARK OFFICE
CERTIFICATE OF CORRECTION

PATENT NO. : 6,667,843 B2
DATED : December 23, 2003
INVENTOR(S) : Robert A. Norman et al.

It is certified that error appears in the above-identified patent and that said Letters Patent is hereby corrected as shown below:

Column 3,
Line 22, delete "motor", insert -- Imotor --

Column 13,
Lines 17 and 39, delete "inc l uding" insert -- including --
Line 40, delete "for an actuator motor"

Signed and Sealed this

Twenty-eighth Day of June, 2005

JON W. DUDAS
*Director of the United States Patent and Trademark Office*